Oct. 23, 1934.   J. L. ANDERSON   1,977,710
MULTIPLE TORCH MACHINE
Filed Sept. 15, 1932   4 Sheets-Sheet 1
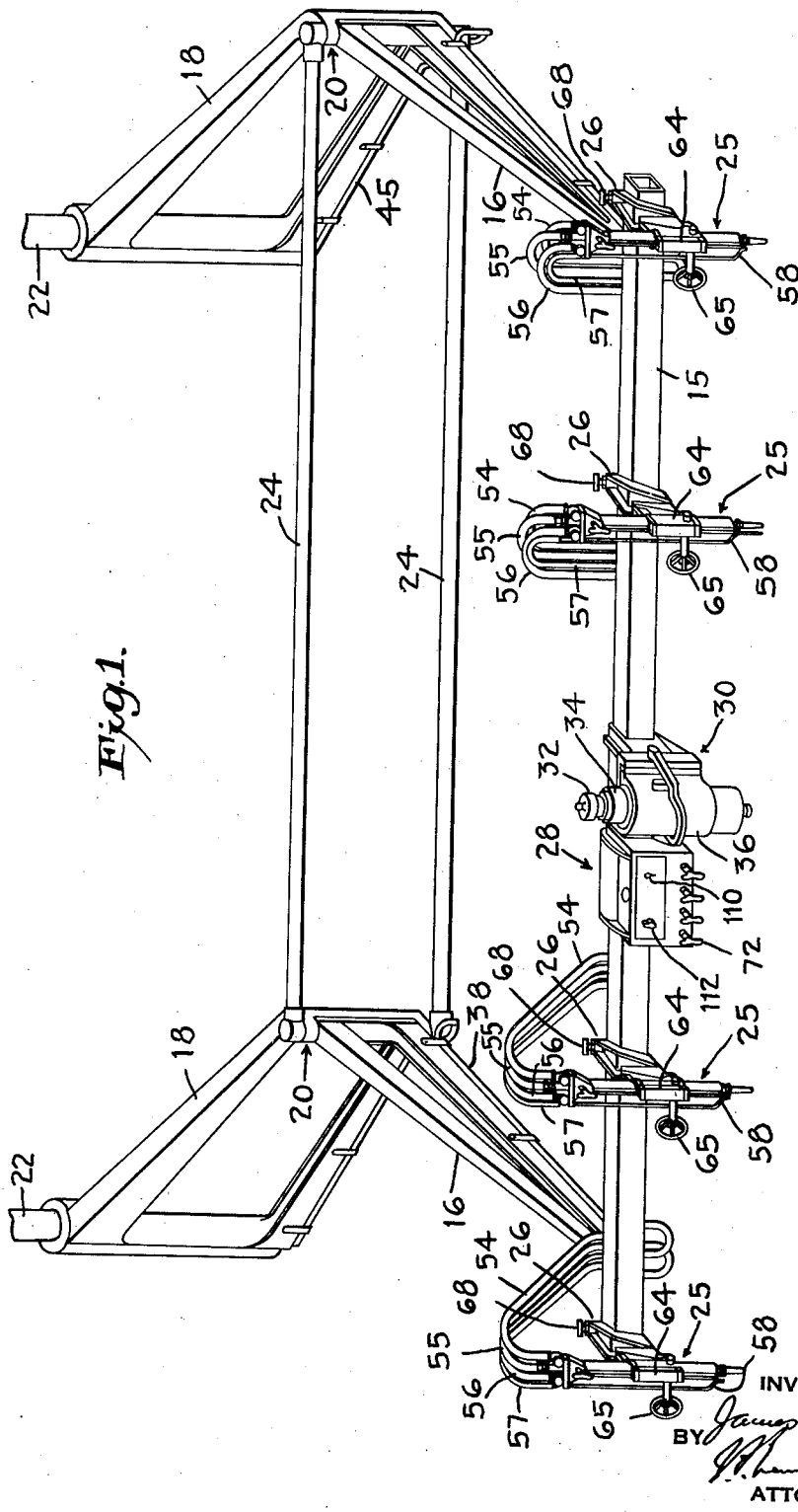

Oct. 23, 1934.
J. L. ANDERSON
1,977,710
MULTIPLE TORCH MACHINE
Filed Sept. 15, 1932
4 Sheets-Sheet 2
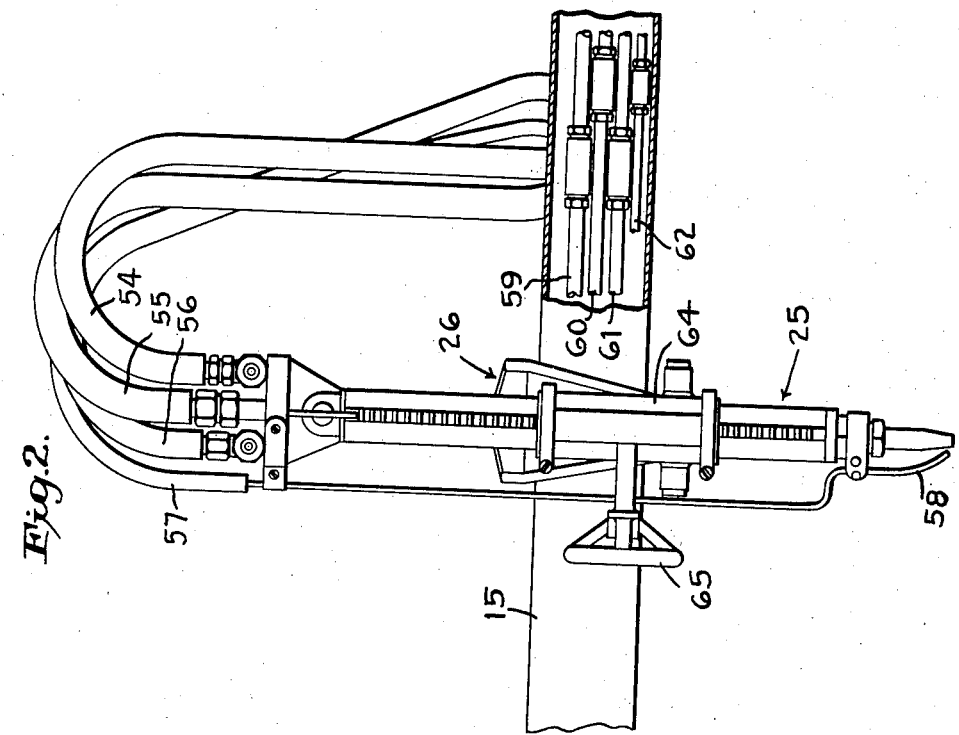
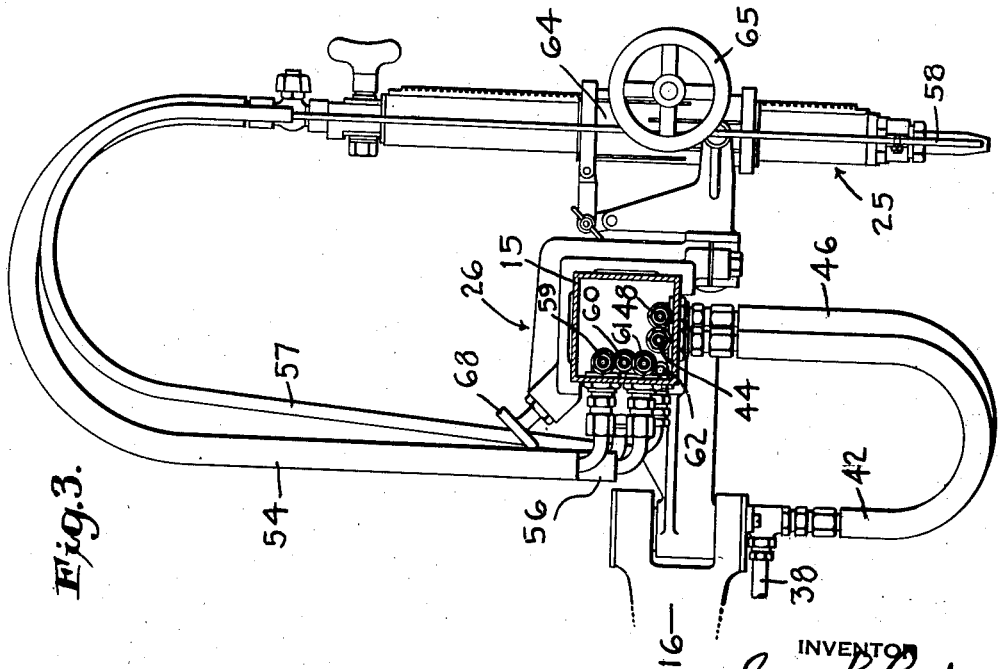
INVENTOR
James L. Anderson
BY
ATTORNEY

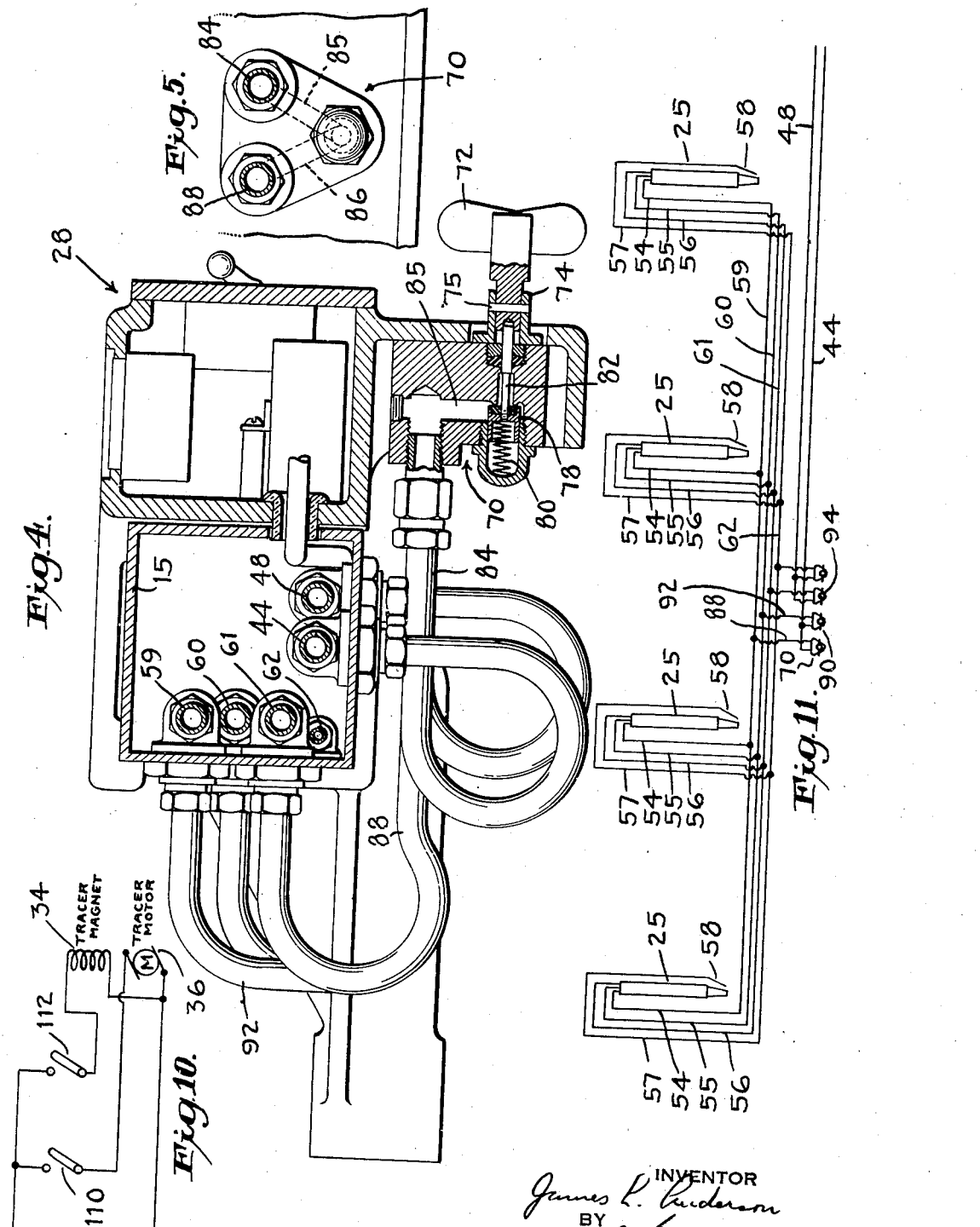

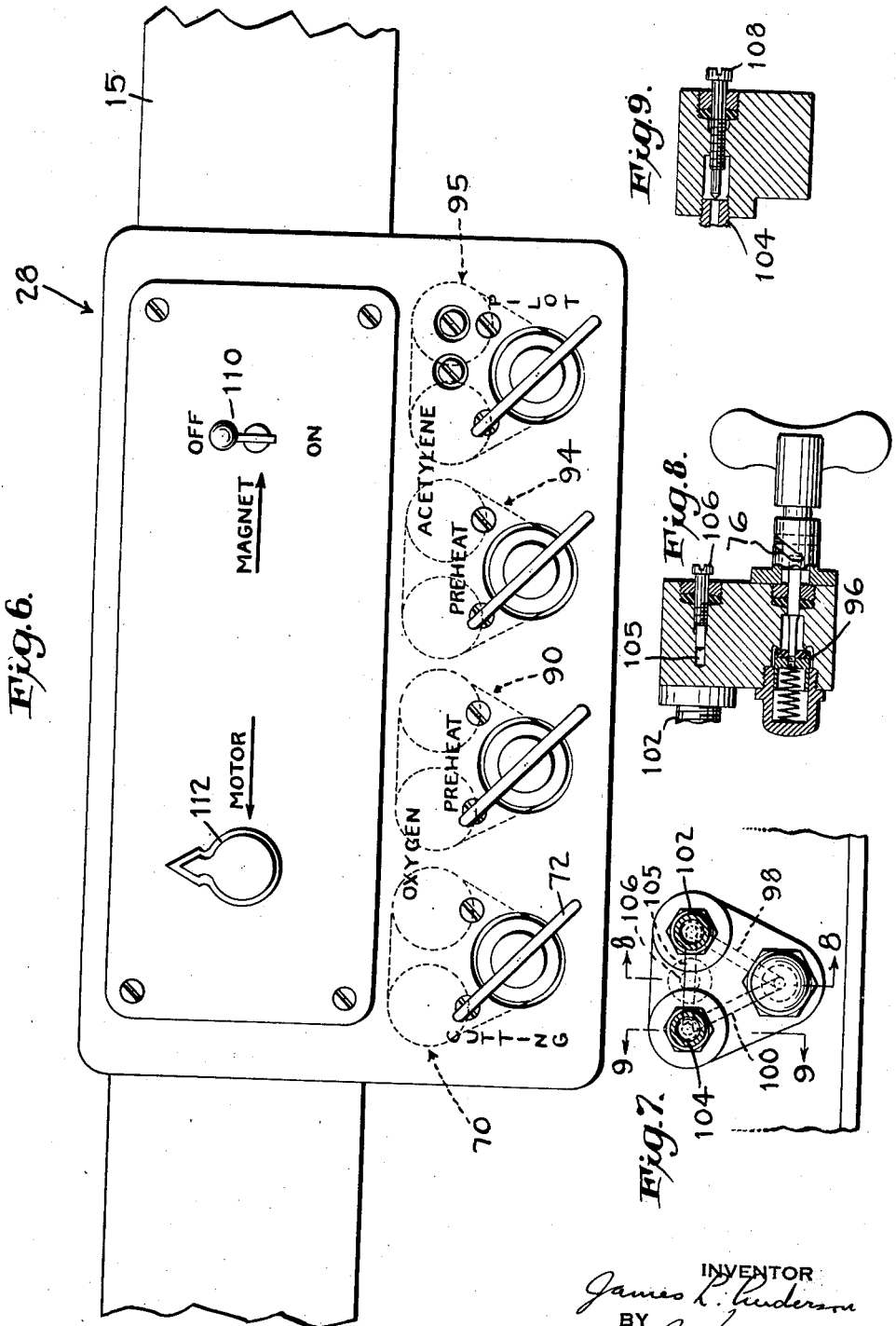

Patented Oct. 23, 1934

1,977,710

UNITED STATES PATENT OFFICE 1,977,710

MULTIPLE TORCH MACHINE

James L. Anderson, Closter, N. J., assignor to Air Reduction Company, Incorporated, New York, N. Y., a corporation of New York Application September 15, 1932, Serial No. 633,262

23 Claims. (Cl. 266—23)

This invention relates to torch apparatus for executing a plurality of duplicate cutting or welding operations simultaneously. Multiple cutting operations are particularly contemplated. The invention relates more especially, though not necessarily exclusively, to universal torch machines. There are many manufacturing purposes for which the ability to make a number of cuts or to cut a number of shapes or designs at one time with the same machine, under the control of a single operator, is much to be desired. In order to make multiple cutting or welding feasible, a system for controlling the supply of gases to all the torches is essential. It is also important to provide an ignition control for all the torches.

For multiple cutting, there are three gas flows to control, namely, a flow of acetylene or other preheating fuel gas, a flow of oxygen to mix with the fuel gas for the preheating flames, and a flow of oxygen to effect the cutting. Usually the fuel gas is turned on and lighted at the preheating orifices of the torches and then the preheating oxygen is turned on, though this may be varied, and the flames are sometimes lighted after both of these gases have been turned on and the mixture is issuing from the preheating orifices. A certain time is required for preheating the metal before starting the cut, and when the heat of the flame jets has brought the metal to the proper condition, the cutting oxygen is turned on. At the completion of the cutting it is naturally desirable to shut off the cutting oxygen immediately. The preheating gases may or may not be turned off at once.

Objects of my invention are to avoid cumbersomeness, to provide a compact and self-contained construction in which the manifolds and controls are carried by or are embodied in the frame or mechanism that supports or that transmits motion to the gang of torches, to reduce hose complication to a minimum, to provide a construction that is economical to manufacture, to eliminate complication in the operation of the master valves, and to furnish a very convenient and reliable multiple control, which gives the attendant the best supervision over the cutting, or welding, and tracing operations. Another object is to centralize the control for a power-driven tracer, or a power-driven template-follower, with the torch controls.

One of the objects of the invention, applicable to multiple cutting and welding apparatus, is to dispose the piping adjacent and parallel with the gang of torches, and more preferably to house the piping in a hollow torch supporting bar. In the case of a universal machine, this bar also carries the tracer.

Further objects are to apply the piping and the controls to a movable torch support, and to operate the master pilot valves directly.

These and other objects and advantages, which will be apparent to those skilled in the art, are attained by the construction and organization herein illustrated and described, the same being a preferred embodiment of this invention.

In the accompanying drawings, forming a part hereof;

Fig. 1 is a perspective view showing enough of a universal cutting machine to illustrate the invention, the machine being equipped with a plurality of torches, for multiple cutting;

Fig. 2 is an enlarged front elevation showing one of the torches of Fig. 1 and a part of the torch supporting bar with the front broken away to show the gas conduits inside;

Fig. 3 is a side elevation of parts shown in Fig. 2, together with a portion of a jointed arm by which the torch bar, shown in cross-section, is carried;

Fig. 4 is a cross-section on a larger scale through the central control box and the torch supporting bar;

Fig. 5 is a fragmentary rear view of the part of the valve casing which is shown in section in Fig. 4;

Fig. 6 is an enlarged front elevation of the central control box;

Fig. 7 is a rear view of the pilot control valve shown in Fig. 6;

Fig. 8 is a section taken on the line 8—8 of Fig. 7;

Fig. 9 is a section taken on the line 9—9 of Fig. 7;

Fig. 10 is a wiring diagram for the electrical connections to the central control box; and Fig. 11 is a piping diagram showing the connections between the gas supply lines, central control valves, distributing manifolds and torches.

Fig. 1 shows a torch supporting bar 15, which is pivotally connected adjacent its opposite ends to arms 16. These arms are supported by arms 18, to which they are pivotally connected at 20. The arms 18 are supported pivotally at 22 on the primary support of the machine. Tie rods 24, pivotally connected with the arms, cause the supporting bar 15 to move always parallel to itself, so that all points on the supporting bar travel over similar paths.

The foregoing is a known construction for universal torch machines which effect a one-to-one reproduction and which make it possible to support two or more torches so that they will be moved in accordance with the same template or drawing. The features of the invention are preferably incorporated in a form of machine having parallel motion linkage including a torch and tracer bar, and the organization illustrated is the preferred embodiment of the invention. Nevertheless other forms of torch machines capable of operating with several torches are known, and in its broader aspects the invention is to be understood as being applicable, with suitable modification, to specifically different types of movable torch supports.

Torches 25, in any desired number and spacing, are held on the supporting bar 15 by clamps 26. The flow of gas to all the torches is controled by valves in a central control box 28, which is carried on the universal torch support at a location which enables the operator to stand where he has good view of the cutting and tracing operations.

The movement of the supporting bar 15 and the torches 25 is effected by a suitable type of power-driven tracer, preferably by an electromagnetic tracer 30 which includes a roller or rollers 32 for following a paramagnetic template, a coil 34 for magnetizing the roller, and electric motor driving mechanism 36 for rotating the roller. The magnetic tracer illustrated may be similar to that shown in the Anderson and Rogers Patent 1,839,170, dated Dec. 29, 1931. This invention is not limited to the use of a magnetic tracer, however, and any other suitable motor-driven tracer, to follow any kind of pattern, whether template or drawing, can be used to move and guide the torches.

Figs. 1 to 3 show the general arrangement of the gas supply lines and distributing manifolds. Oxygen is supplied from some stationary source, not shown, through a flexible conduit 38 which extends along the arms 18 and 16. The conduit 38 connects, near one end of the bar 15, with a connecting conduit 42, which in turn connects with a pipe 44 which extends along the inside of the supporting bar 15 and supplies this gas to valves in the central control box, which will be described later.

Acetylene is supplied to the valves of the central control box through a conduit 45, connecting conduit 46, and pipe 48, these being similar to the corresponding parts of the oxygen supply line. The conduit 45 and connecting conduit 46 are shown at the end of bar 15 remote from conduit 38.

The torches 25 are conventional three-hose cutting torches. Connected to each of them are short flexible hoses 54, 55 and 56, to supply cutting oxygen, preheating oxygen and acetylene, or other fuel gas, respectively, to the torch. Another short hose 57, one for each torch, supplies gas to the pilot 58 associated with, or it may be incorporated in, the torch. The pilots are preferably supplied from the same source of fuel gas as the preheating flames.

Gas distributing manifolds 59, 60, 61 and 62 extend along the inside of the supporting bar 15 and supply cutting oxygen, preheating oxygen, preheating fuel gas, and gas for the pilots, respectively. The gas to these manifolds is controlled by the valves at the central control box previously referred to. The hoses 54, 55, 56 and 57 are connected with the manifolds 59, 60, 61 and 62, respectively, by suitable fittings.

Each of the torches 25 is held in a holder 64 and is adjustable vertically by a hand-wheel 65. Each torch holder is carried by one of the clamps 26 which fits the supporting bar 15 and is held at any desired position on the bar by a clamping screw 68. Since the hoses connected with the torches are flexible, the clamp can be released and the torches can be shifted along the bar either way to such positions as may be desired.

Fig. 4 shows a section through the cutting oxygen control valve 70. This valve includes a handle 72 fitting a bearing sleeve 74 and having a cross pin 75 extending into a cam slot in the sleeve. This cam slot is not shown in Fig. 4, but is similar to the cam slot 76 in Fig. 8. A quarter-turn of the handle 72 moves the pin 75 from one end of the cam slot to the other and causes the handle to move longitudinally in the sleeve. A valve proper 78 is normally held in closed position by a spring 80. A pin 82 extending through the front of the valve casing between the valve proper and the handle 72 transmits thrust to open the valve when the handle moves inward in the sleeve 74.

When the valve proper 78 is in open position, oxygen from the pipe 44 flows through a connecting pipe 84 to a conduit 85 in the casing of the valve 70. From the conduit 85, the gas flows past the valve proper 78, through a conduit 86 (Fig. 5), and then through a pipe 88 which connects with the cutting oxygen manifold 59. Thus, turning of the handle 72 moves the valve 78 to control the flow of oxygen for cutting to the manifold 59, and through it to all the torches.

A control valve 90 (Fig. 6) is similar to the control valve 70 and regulates the flow of gas from the oxygen pipe 44 to pipe 92 (Fig. 4) which supplies the preheating oxygen manifold 60 of all the torches. A similar valve 94 controls the flow of gas from the acetylene pipe 48 to the acetylene manifold 61 of the torches.

A pilot control valve 95 is of somewhat different design than the other control valves, and is shown in detail in Figs. 7 to 9. A valve head 96 is operated in the same way as the valve proper 78 of the valve 70. This valve head 96 controls the flow of gas from a conduit 98 to a conduit 100, both in the valve casing. The conduit 98 connects with the acetylene pipe 48 through a pipe 102, the end of which is shown in Fig. 8. The conduit 100 connects with the pilot manifold 62 through a pipe 104, a part of which is shown in Fig. 7.

When the pilot valve is closed, enough gas to maintain the pilot flame flows through a by-pass conduit 105. This by-pass provides a direct connection between the conduits 98 and 100, regardless of the position of the valve head 96. The amount of gas flowing through the by-pass conduit can be regulated by a screw 106, which threads through the front of the valve casing and extends into the by-pass conduit. By turning the screw further into the by-pass, the obstruction to the gas can be increased and the amount of gas flowing to the pilot will be reduced.

The amount of gas flowing through the pilot valve when open can be regulated by a screw 108 (Fig. 9), which threads through the front of the valve casing and controls the flow of gas out of the pipe 104.

The electricity for energizing the magnetic tracer is turned on or off by a switch 110, and the power for the tracer motor is controlled by a switch 112. Fig. 10 shows a wiring diagram for the switches.

Fig. 11 shows a diagram of the pipe connections.

The invention is applicable to welding operations as well as to cutting, with the substitution of welding for cutting torches. In that event, one of the oxygen manifolds and one of the oxygen valves would not be used, or would be omitted if the machine were designed for welding purposes only. A welding torch requires only acetylene and one supply of oxygen, to produce the oxyacetylene welding flame.

Changes in the piping connections, as well as other charges, modifications, substitutions or omissions may be made without departing from the invention set forth in the appended claims.

I claim:

1. A multiple torch machine including a torch supporting bar; a plurality of torches connected with the bar; a manifold extending along the bar; and a conduit connecting each of the torches with the manifold.

2. A multiple torch machine including a hollow torch supporting bar; a plurality of torches supported by the bar; a manifold extending along the bar and enclosed therein; and conduits connecting the manifold with each of the torches.

3. A multiple cutting torch apparatus including a universally movable torch supporting bar; a plurality of torches carried by the bar; three conduits connected with each torch for supplying cutting oxygen, preheating oxygen, and fuel gas; and three manifolds supported by the bar and extending lengthwise thereof for supplying cutting oxygen, preheating oxygen and fuel gas to the corresponding conduits for each of the torches.

4. The apparatus set forth in claim 3, with the supporting bar hollow and the manifolds enclosed within the bar as a housing.

5. In a universal torch machine, means for supporting a plurality of torches for universal movement in a plane; a conduit for supplying gas to all the torches; and central control means including a valve carried by and movable with the torch supporting means for controlling the supply of gas through said conduit.

6. A universal torch machine including a torch supporting bar; means supporting the bar for universal movement in a plane; a plurality of torches connected with the bar; a conduit for supplying gas to the torches; and control means including a valve carried by the bar for controlling the flow of gas through the conduit.

7. A cutting machine including a frame; a plurality of torches; torch supporting means connected with the frame and movable to give the torches universal movement in a plane; a plurality of manifolds extending along the torch supporting means for supplying cutting oxygen, preheating oxygen, and fuel gas to the torches; a central control apparatus carried by the supporting means and including devices connected with the respective manifolds to control the flow of gas through said manifolds and thus control the gas flows to all of the torches.

8. A cutting machine including a bar supported for universal movement in a plane; a plurality of torches carried by the bar; a plurality of manifolds extending along the bar for supplying cutting oxygen, preheating oxygen, and fuel gas to the torches; central control apparatus carried by the bar and connected with each of the manifolds, said control apparatus including means to selectively control the flow of gas through any of the manifolds.

9. A torch machine including a plurality of torches; means supporting the torches for universal movement in a plane; a conduit for supplying gas to the respective torches; and valve means carried by and movable with the torch supporting means, and connected with the conduit to control the flow of gas through the conduit and simultaneously control the supply of gas to all the torches.

10. A torch machine including a primary support; a plurality of torches; torch supporting means connected with the primary support and movable to give the torches universal movement in a plane; a manifold extending along the torch supporting means and enclosed thereby; a connection between the manifold and the respective torches for supplying gas from the manifold to said torches; a housing carried by the torch supporting means; a central control valve in the housing and connected with the manifold to simultaneously control the flow of gas to all the torches; and a valve operating handle supported by the housing.

11. In a torch machine; a bar supported for universal movement in a plane; a plurality of torches carried by the bar; a gas distributing manifold extending along the bar; connections between the manifold and the respective torches; and a control valve supported by the bar and connected with the manifold for controlling the flow of gas through the manifold to the torches.

12. A torch machine including a torch holding bar supported for universal movement in a plane; a plurality of torches carried by the bar; a gas distributing manifold extending along the bar and connected with the respective torches; and a gas supply line extending along the bar.

13. A torch machine including a primary support; movable means connected with the primary support for supporting a plurality of torches for universal movement in a plane; a gas supply line extending along the torch supporting means; a conduit extending along the torch supporting means and paralleling the supply line along a part of its length; a connection between the supply line and said conduit including a control valve carried by the torch supporting means; and other connections through which gas is supplied by said conduit to the torches.

14. A torch machine including a torch holding bar supported for universal movement in a plane; a plurality of torches carried by the bar; a gas distributing manifold extending along the bar and connected with the respective torches; a gas supply line extending along the bar; and a valve carried by the bar and connected between the distributing manifold and the supply line to control the flow of gas from the supply line to the manifold and thereby simultaneously control the supply of gas to all of the torches.

15. A machine including a bar supported for universal movement in a plane; a plurality of torches carried by the bar; a gas distributing manifold extending along the bar and connected with the respective torches; a power operated tracer connected with the bar for guiding the bar and torches along a convenient path; and central control apparatus carried by the bar and including a valve to control the flow of gas to the manifold and simultaneously control the supply of gas to all of the torches, and an electric switch for controlling the operation of the tracer.

16. A machine including a support; a bar;

pivoted arms connecting the bar with said support for parallel movement in a plane; a torch carried by the bar; and a gas supply line extending along the pivoted arms and along the bar to supply gas to the torch.

17. A machine including a support; a bar; pivoted arms connecting the bar with the frame for parallel movement in a plane; a gas distributing manifold extending along the bar; a plurality of torches carried by the bar and connected with the manifold; a gas supply line extending along the pivoted arms; and valve means connecting the supply line with the manifold and controlling the flow of gas into the manifold.

18. In a universal torch machine, torch supporting means; a gas conduit extending along the torch supporting means and carried thereby; a cutting torch carried by the supporting means and movable transversely into different positions along a part of the length of said supporting means; and a flexible conduit connecting the torch with the gas conduit.

19. A machine including a bar supported for universal movement in a plane; a torch carried by the bar and adjustable lengthwise along the bar; a gas conduit extending along the bar; a flexible conduit connecting the torch with the gas conduit; and a valve carried by the bar and connected between the gas conduit and the flexible conduit to control the flow of gas to the torch.

20. In a multiple torch machine, a bar; a plurality of manifolds carried by the bar, extending substantially parallel to the bar, each manifold having branches for connection with a plurality of torches; and valves for controlling the flow of gas to the torches.

21. In a multiple torch machine, a hollow bar for supporting a plurality of torches; a plurality of manifolds housed in the bar and extending lengthwise in the bar, each manifold having branches extending through the side of the bar for connection with the torches.

22. In a multiple torch cutting machine, a bar for supporting a plurality of torches; three manifolds extending lengthwise along the bar, each manifold having a branch for connection with each of the torches; two gas supply lines, one of which is connected to two of the manifolds for supplying oxygen to said manifolds, and the other of which supplies fuel gas to the third manifold.

23. In a multiple torch machine, the combination with a movable structure serving as a support for a plurality of torches, and means for operating said structure to cause the torches to execute similar movements in performing their work on metal, of a plurality of gas manifolds on said movable structure, with supply connections and a plurality of connections from each manifold to the respective torches, valves on the movable torch supporting structure commanding the supply of gases to said manifolds, and manual controls for said valves grouped on said supporting structure.

JAMES L. ANDERSON.